United States Patent [19]

Ito et al.

[11] Patent Number: 5,515,483
[45] Date of Patent: May 7, 1996

[54] RENDERING SYSTEM

[75] Inventors: Kazumasa Ito, Tokyo; Hiroshi Kato, Kanagawa; Junichi Fujita, Tokyo, all of Japan

[73] Assignee: Sony Corporation, Tokyo, Japan

[21] Appl. No.: 92,671

[22] Filed: Jul. 15, 1993

Related U.S. Application Data

[63] Continuation of Ser. No. 906,949, Jun. 30, 1992, abandoned.

[30] Foreign Application Priority Data

Jul. 12, 1991 [JP] Japan .................................. 3-198713
Jan. 31, 1992 [JP] Japan .................................. 4-046169

[51] Int. Cl.$^6$ .................................................. G06F 15/62
[52] U.S. Cl. .......................................... 395/119; 395/121
[58] Field of Search .......................... 395/119, 121–122, 395/126, 129, 141, 143, 155–164

[56] References Cited

U.S. PATENT DOCUMENTS

| | | | |
|---|---|---|---|
| 4,805,116 | 2/1989 | Liang et al. ............................. | 395/129 |
| 4,855,935 | 8/1989 | Lien et al. .............................. | 395/142 |
| 4,878,182 | 10/1989 | Aranda et al. ......................... | 395/143 |
| 4,951,230 | 8/1990 | Dalrymple et al. .................... | 395/166 |
| 4,988,984 | 1/1991 | Gonzalez-Lopez .................... | 340/728 |
| 5,025,405 | 6/1991 | Swanson ................................ | 395/143 |

*Primary Examiner*—Mark R. Powell
*Assistant Examiner*—Ba Huynh
*Attorney, Agent, or Firm*—Limbach & Limbach; Alan S. Hodes

[57] ABSTRACT

A three-dimensional primitive rendering system is disclosed, which comprises first and second registers for storing first and second incremental values of primitive data, respectively, a first adder and a third register for successively adding one of outputs of the first and second registers, fourth and fifth registers for storing first and second incremental values of an evaluation coefficient, respectively, and a second adder and a sixth register for successively adding one of outputs of the fourth and fifth registers, wherein the selection of the outputs of the first and second registers and that of the fourth and fifth registers are performed in accordance with a sign bit received from the sixth register.

3 Claims, 12 Drawing Sheets

RENDERING SYSTEM

This is a continuation of U.S. application Ser. No. 07/906,949 filed on Jun. 30, 1992.

BACKGROUND OF THE INVENTION

1. Field of the Invention

The present invention relates to a rendering system for use in computer graphics.

2. Description of the Prior Art

So far, an image rendering system using the Bresenham's algorithm has been known. In the conventional rendering system for accomplishing the Bresenham's algorithm, incremental values of a minor axis were limited to one of 1, 0, and −1. Thus, this rendering system only computed X and Y coordinates for lines and edges rather than Z values and color data.

Therefore, the Z values and color data were computed by another rendering system for successively adding an incremental value. However, when the accuracy of the incremental value was not satisfactorily high, there was a probability where an error took place. In addition, with respect to the outer lines of a triangle, when the accuracy was satisfactorily high, since a rendering system for successively adding an incremental value was used, there was a probability where an error took place.

OBJECTS AND SUMMARY OF THE INVENTION

Therefore, an object of the present invention is to provide a rendering system for performing a rendering process with a high accuracy.

According to an aspect of the present invention, there is provided a rendering system for applying a standard Bresenham's algorithm or a special Bresenham's algorithm to an initial value of coordinate data of each axis composed of three dimensions and for computing new coordinate data. The special Bresenham's algorithm being arranged to extend a slope of a segment to a particular value.

According to another aspect of the present invention, there is provided a rendering system for applying a standard Bresenham's algorithm or a special Bresenham's algorithm to an initial value of coordinate data of each axis composed of three dimensions and for computing new coordinate data. The special Bresenham's algorithm being arranged to extend a slope of a segment to a particular value, wherein a particular value is successively added as data of a Z coordinate in accordance with an increment of a minor axis in the new coordinate data.

According to the present invention, for initial values of coordinate data of axes X, Y, and Z composed of three dimensions, with respect to coordinate data of axes X and Y, the standard Bresenham's algorithm is applied. On the other hand, with respect to coordinate data of axis Z and color data, the special Bresenham's algorithm for extending a slope of a segment to a particular value is applied. Thus, a proper incremental value is selected and thereby new coordinate data is computed. Further, according to the present invention, for initial values of coordinate data of axes X, Y, and Z, with respect to coordinate data of axes X and Y, the standard Bresenham's algorithm or the special Bresenham's algorithm for extending a slope of a segment to a particular value is applied. Thus, new coordinate data is computed. On the other hand, with respect to coordinate data of axis Z, a proper incremental value is selected in accordance with an increment of coordinate data of a minor axis of new coordinate data and data in accordance with the new coordinate data is obtained.

With respect to color data, when edges and lines are rendered, the special Bresenham's algorithm for extending a slope of a segment to a particular value is applied. Thus, a proper incremental value is selected and color data in accordance with new coordinate data is computed. When the sides of a triangle are rendered, a proper incremental value is selected in accordance with an increment of coordinate data of a minor axis of new coordinate data and data in accordance with the new coordinate data is obtained.

The above, and other, objects, features and advantage of the present invention will become readily apparent from the following detailed description thereof which is to be read in connection with the accompanying drawings.

DETAILED DESCRIPTION OF THE PREFERRED EMBODIMENT

Next, with reference to FIGS. 1 to 14, an embodiment in accordance with the present invention will be described. In the following description, as an example of rendering systems, a three-dimensional primitive rendering system, namely, a line processor is used. In the following description, primitives represent polygonal primitives for directly imaging a polygon, for example a triangle and a square or a geometric figure formed thereby.

This three-dimensional primitive rendering system, that is, a line processor, renders primitives in two or three dimensions at a high speed. When the system receives a rendering parameter, it outputs rendering data pixel by pixel at a speed of, for example, up to 25 M pixels/sec.

Examples of rendering primitives are:
Line . . . two or three dimensions
Triangle . . . two or three dimensions
Rectangle . . . two or three dimensions
Polygon . . . two or three dimensions
Bit map . . . two dimensions
Pixel map . . . two dimensions
Scan line pixel . . . three dimensions For the above mentioned primitives, for example five types of color outputs are provided where necessary.
Real color data (24 bits)
Index color data (10 bits)
Dither color data (3 bits and 4 bits)
XP color data (1 bit)

In addition, where necessary, the following attributes are added.
Line pattern (32 bits)
Hatch pattern (16×16 bits)
Semitransparent pattern (4×4 bits)
Line width (3, 5)

Figure 1:
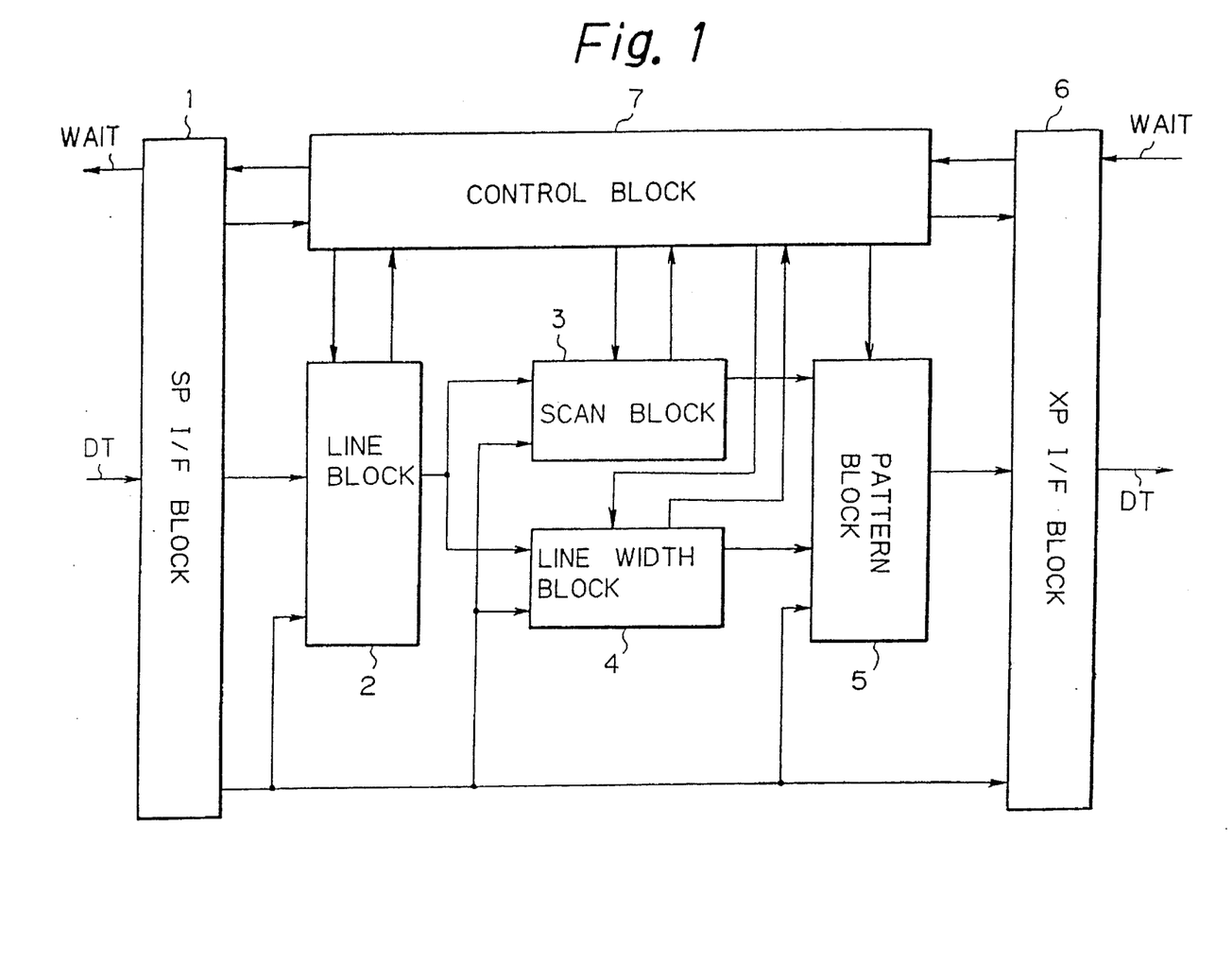
FIG. 1 is a block diagram showing an overall construction of an embodiment of the present invention.

As shown in FIG. 1, the three-dimensional primitive rendering system mainly comprises an SP interface block 1, a line block 2, a scan block 3, a line width block 4, a pattern block 5, an XP interface block 6, and a control block 7.

The SP interface block 1 is a block for storing a parameter necessary for generating a primitive. The SP interface block 1 is a block for decoding an address being received and for sending various load signals to various registers and so forth. The SP interface block 1 is prohibited from outputting the various load signals in accordance with an inner state. In this situation, until the prohibition is released, the SP interface block 1 sends a wait signal WAIT to the just upstream circuit block (not shown) and temporarily stops receiving data DT. When the prohibition is released, the SP interface block 1 outputs a load signal and stops outputting the wait signal WAIT to the just upstream circuit block.

The line block 2 is a block for generating a line and an outer line of a polygon by using various algorithms, for example the Bresenham's algorithm. The construction and the function of the line block 2 will be described later in more detail.

The scan block 3 is a block for scanning the inside of a polygon in the direction of the X axis. In other words, the scan block 3 interpolates data being received in the direction of the X axis. An interpolation circuit is provided for each data of X, Z, R, G, and B.

The line width block 4 is a block for generating a thick line. In other words, the line width block 4 renders a predetermined number of pixels which surround a center point of the X and Y coordinates given by the line block 2.

The pattern block 5 is a block for adding an attribute such as a line pattern, a hatch pattern, a semitransparent pattern, and a dither pattern to a primitive being rendered. In other words, the pattern block 5 is provided with a line pattern, a hatch pattern, a semitransparent pattern, and a dither pattern. The pattern block 5 references these patterns pixel by pixel and adds them to each data.

The XP interface block 6 is a block for sending a rendered primitive to the just downstream circuit (not shown) pixel by pixel.

The control block 7 is a block for controlling the entire three-dimensional primitive rendering system.

The three-dimensional primitive rendering system in accordance with the present invention can render the following primitives.

(1) Lines
(2) Sides of triangles
(3) Edges of primitives

To generate these primitives, the following algorithms are used:

|  | X and Y coordinates | Z values | Color data |
| --- | --- | --- | --- |
| Lines | Bresenham | Bresenham with slope of more than 1 | Bresenham with slope of more than 1 |
| Sides of Triangles | Bresenham with special Y major | Selection DDA | Selection DDA |
| Edges | Bresenham | Selection DDA | Bresenham with slope of more than 1 |

How each algorithm can be accomplished will now be described.

(1) Bresenham

The Bresenham's algorithm is used to render a line through computations of integers.

For example, it is assumed that a point A and a point B are placed at coordinates (X1, Y1) and (X2, Y2), respectively. In this situation, a line which connects these two points is rendered. In addition, dx and dy are defined as follows:

$$dx = X2 - X1, \ dy = Y2 - Y1$$

Moreover, dx and dy are defined as follows:

$$|dx| \geq |dy|, \ dx \geq 0, \ dy \geq 0$$

Figure 4:
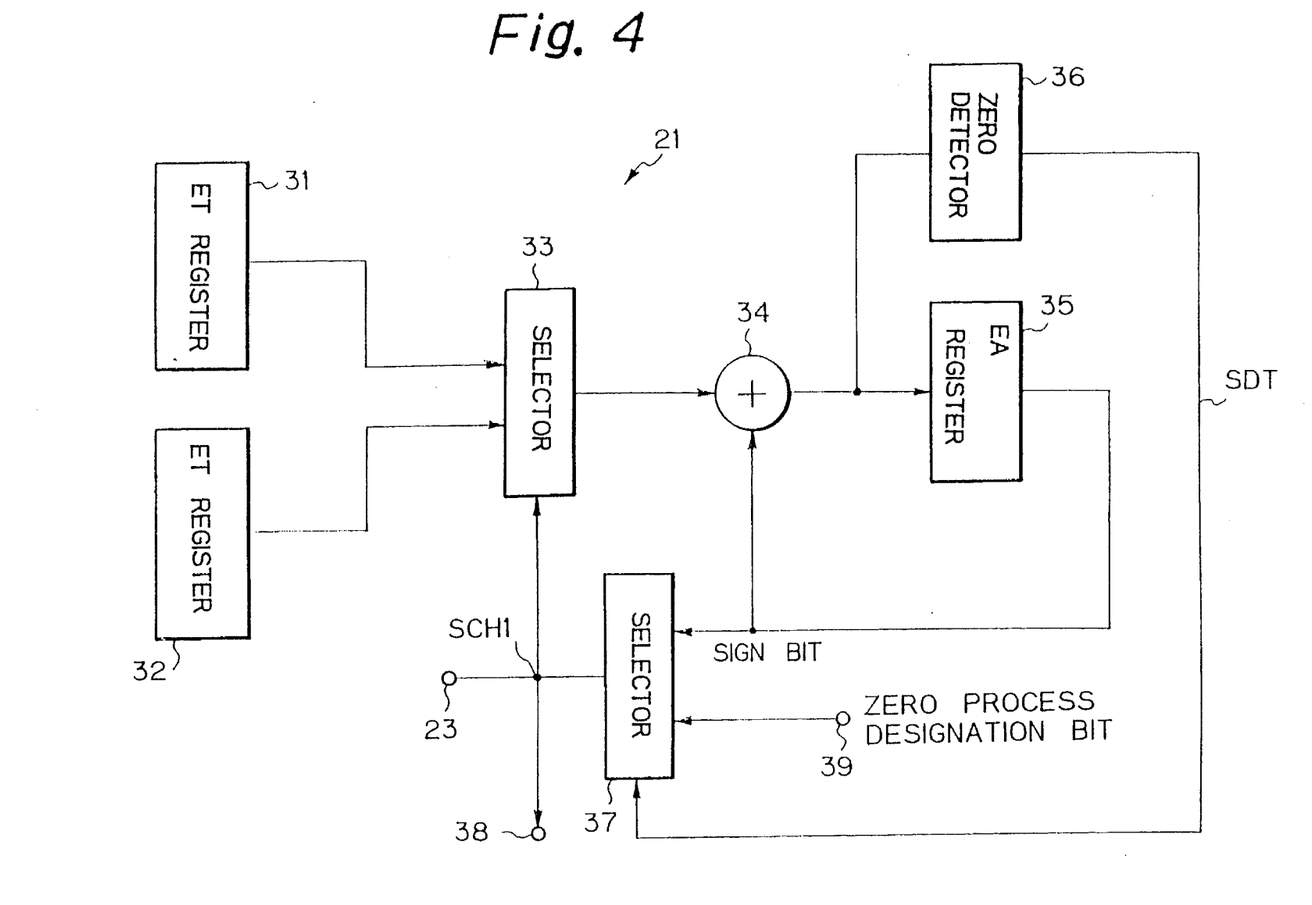
FIG. 4 is a block diagram showing a construction of a determination unit in the XS block.
Figure 5:
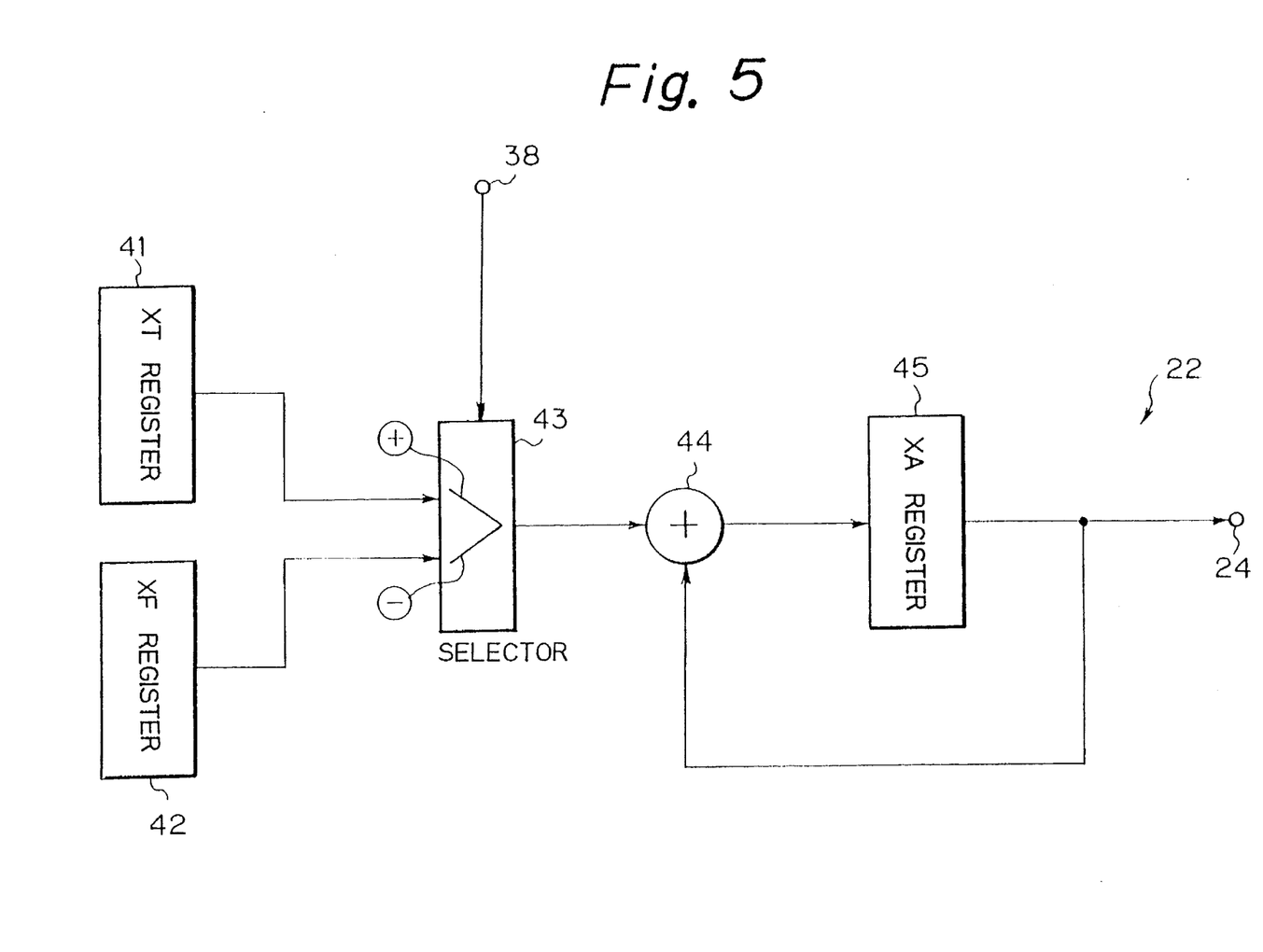
FIG. 5 is a block diagram showing a construction of a computation unit in the XS block.

When the contents of the following registers (see FIGS. 4 and 5) are set as follows, the value of the Y coordinate starting from the point A can be obtained as the outputs of an XA register. The value of the X coordinate can be obtained by adding "1" to the value of the Y coordinate:

EA register . . . −|dx|+2|dy| (which is the discriminant E of the Bresenham's algorithm.)
ET register . . . 2 |dy|−2|dx|
EF register . . . 2 |dy|
XA register . . . Y1
XT register . . . 1 (incremental value)
XF register . . . 0 (incremental value)

(2) Bresenham with slope of more than 1

In rendering a line, with respect to the X and Y coordinates, the variation in the major axis direction by one step results in the variation in the minor axis direction by at most "±1". However, with respect to Z values and color data, in the same situation, the variation may becomes "±1" or more.

Figure 13:
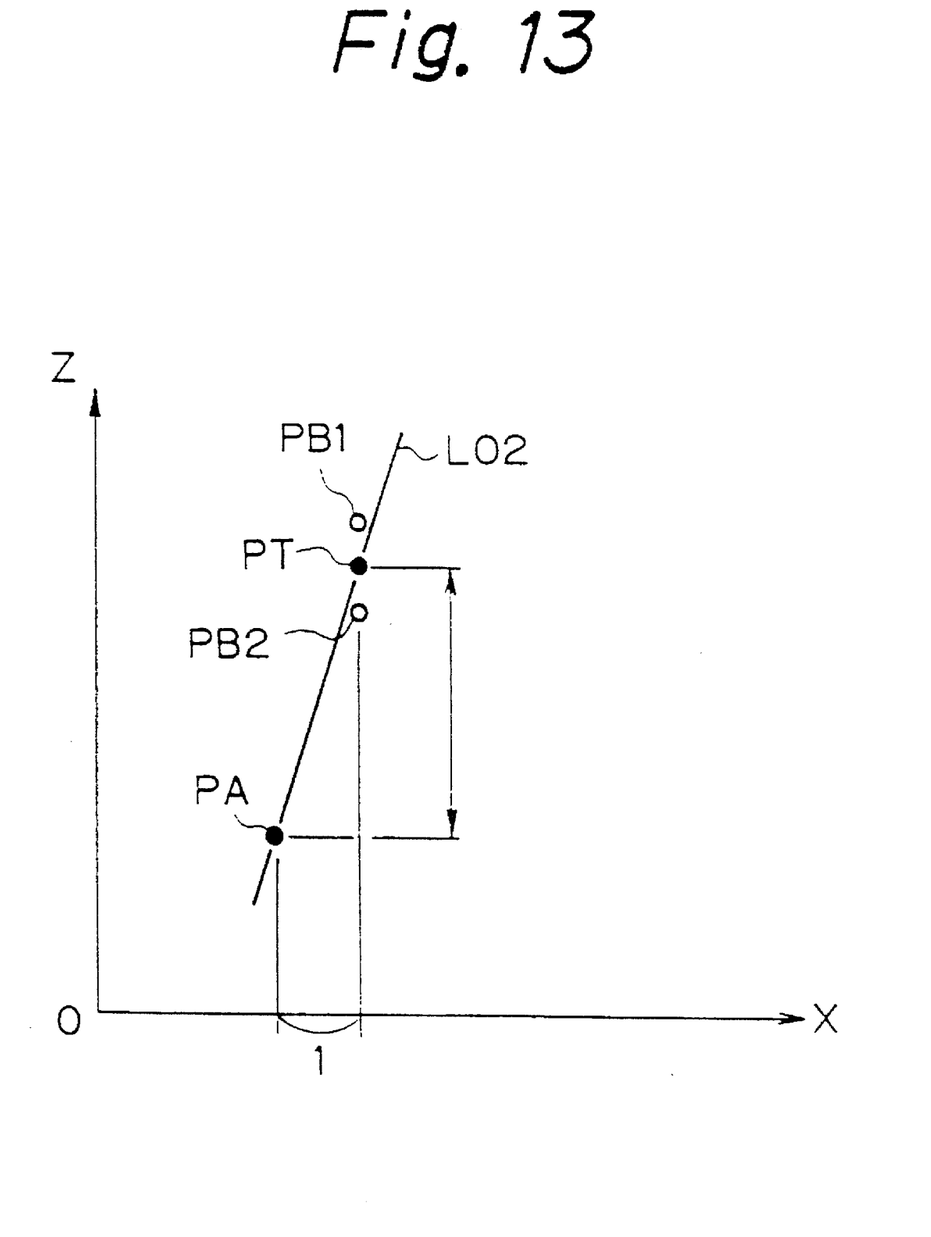
FIG. 13 is a chart describing the Bresenham's algorithm with slope of more than 1.

FIG. 13 shows a chart describing the Bresenham's algorithm with slope of more than 1.

On the X-Z coordinate plane shown in FIG. 13, a line LO2 is set. When the value of the X axis is increased by (+1), the point is moved from PA to PT on the line LO2.

The value represented with the point PT is a true value. As a real Z value, either a point PB1 over the point PT or a point PB2 below the point PT is selected. The selection of either the point PB1 or the point PB2 is determined in accordance the sign (plus or minus) of the discriminant E of the Bresenham's algorithm with slope of more than 1. This discriminate E will be described later.

For example, it is assumed that a point A and a point B are placed at coordinates (X1, Y1) and (X2, Y2), respectively and that Z values of the points A and B are Z1 and Z2, respectively. In this situation, Z values of pixels of a line which connects these two points are obtained. In addition, dx, dy, and dz are defined as follows:

$dx=X2-X1, dy=Y2-Y1, dz=Z2-Z1$

Moreover, s and dB are defined as follows:

$s=dz/dx$ $dB=dz\%dx$ where "/" is an operator which is used to divide a numerator by a denominator and to round off the decimal part of the obtained result; "%" is an operator which is used to divide a numerator by a denominator and to obtain the remainder as the result.

Moreover, it is assumed that there is the following relation among dx, dy, and dz:

$|dx| \geq |dy|, dx \geq 0, dz \geq 0$

When the contents of the following registers are set as follows, the Z value starting from the point A can be successively obtained as the output of the ZA register:

EZA register . . . $-|dx|+2|dB|$ (which is the discriminator E of the Bresenham's algorithm with slope of more than 1. $E=-|dx|+|dB|$)
EZT register . . . $2|dB|-2|dx|$
EZF register . . . $2|dB|$
ZA register . . . Z1
ZT register . . . s+1 (incremental value)
ZF register . . . s (incremental value)

(3) Bresenham's algorithm with special Y major

Figure 12:
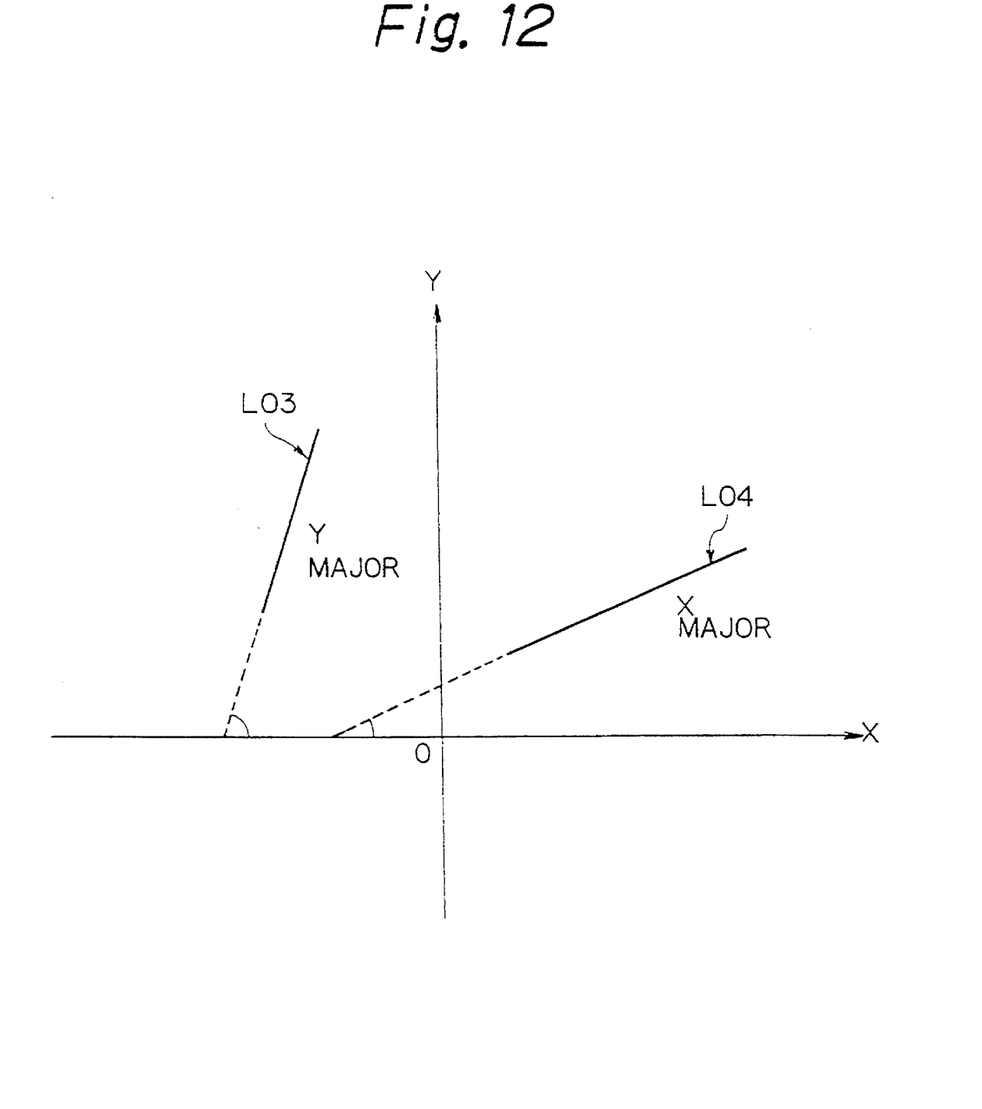
FIG. 12 is a chart describing the concept of a major axis and a minor axis.

Before describing the Bresenham's algorithm with special Y major, with reference to FIG. 12, a major (major axis) and a minor (minor axis) will be outlined. Now, it is assumed that there are lines L03 and L04 on the X-Y coordinate plate shown in FIG. 12. With respect to the line L04, when the angle to the plus side of the X axis in the counterclockwise direction is 45° or less; in the range from 135° to 225°; or 315° or more, this X axis is referred to as the major axis and this Y axis is referred to as the minor axis. On the other hand, with respect to line LO3, when the angle to the plus side of the X axis in the counterclockwise direction is in the range from 45° to 135° or in the range from 225° to 315°, this X axis is referred to as the minor axis and this Y axis is referred to as the major axis.

with respect to the major axis, when a line is rendered, the amount of variation from the initial point to the terminal point is either (+1) or (−1). When the amount of variation is (+1), the line does not vary by (−1), and the amount of variation of both (+1) and (−1) does not occur. This can also apply to the case where the amount of variation is (−1).

Now, the absolute values of the amount of variation in the X and Y directions on the X-Y coordinate plane are defined as dx and dy, respectively. When these values are compared in the condition where dx<dy, this relation is referred to as the Y major.

On the other hand, in the condition where dx>dy, this relation is referred to as the X major.

In the Bresenham's algorithm with special Y major, the Y axis is always treated as the major axis regardless of what the slope of a segment is.

The Bresenham's algorithm with special Y major will now be described.

Pixels on the sides of a triangle and edge-flag-fill outer contour lines are always rendered by the Y major. Thus, in these cases, the slope of a line may exceed "1".

For example, it is assumed that a point A and a point B are placed in coordinates (X1, Y1) and (X2, Y2), respectively. In this situation, a side which connects these two points is rendered. Now, dx, and dy are defined as follows:

$dx=X2-X1, dy=Y2-Y1$

In addition, s and dB are defined as follows:

$s=dx/dy$ $dB=dx\%dy$ where "/" is an operator which is used to divide a numerator by a denominator and to round off the decimal part of the obtained result; "%" is an operator which is used to divide a numerator by a denominator and to obtain the remainder as the result.

Moreover, it is assumed that there is the following relation between dx and dy:

$dx \geq 0, dy \geq 0$

When the contents of the following registers are set as follows, the value of the X coordinate starting from the point A can be successively obtained as the output of the XA register. The value of the X coordinate can be obtained by adding "1" to the value of the Y coordinate:

EA register . . . $2|dB|$ (which is the discriminant E of the Bresenham's algorithm with special Y major.)
ET register . . . $2|dB|-2|dy|$
EF register . . . $2|dB|$
XA register . . . X1
XT register . . . s+1 (incremental value)
XF register . . . s (incremental value)

Figure 14:
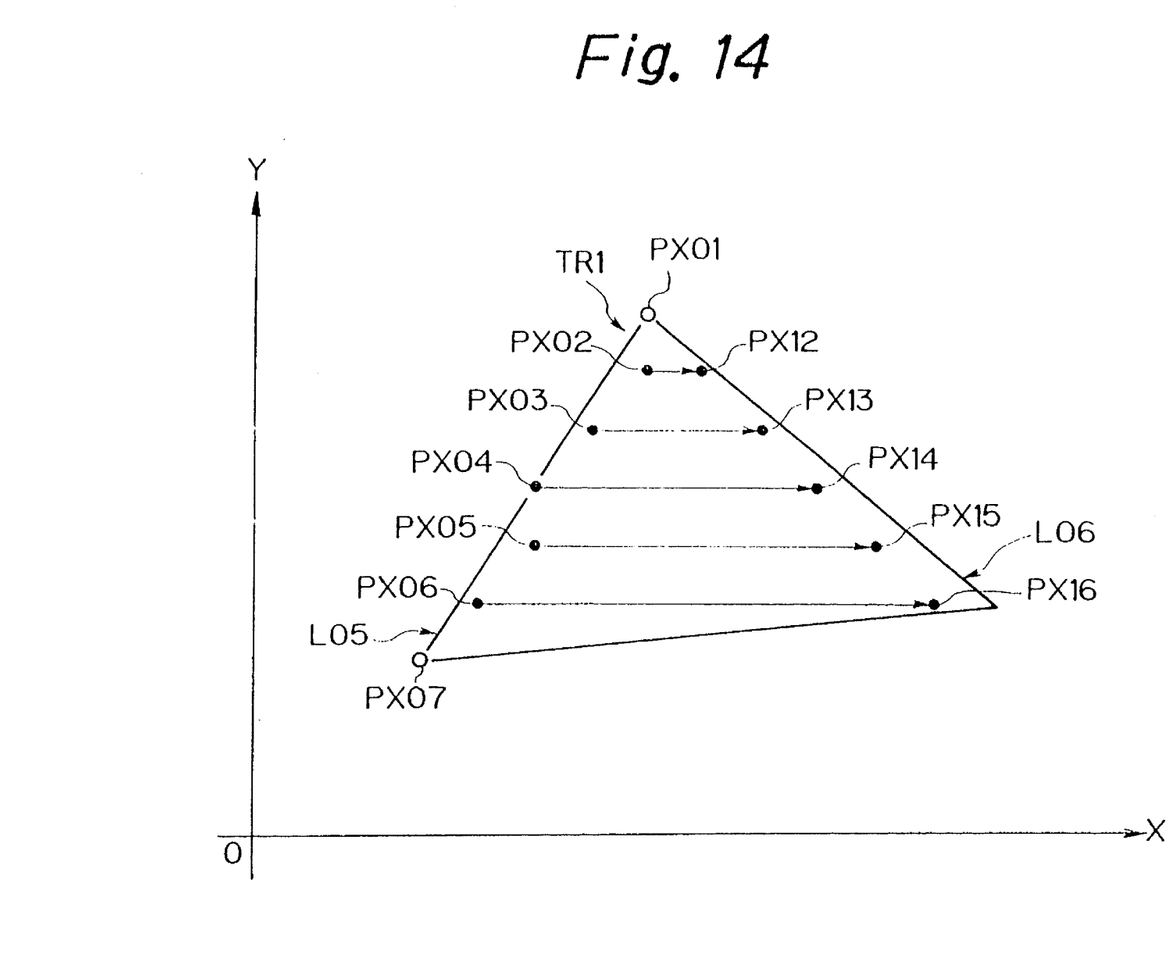
FIG. 14 is a chart describing sides of a triangle, an interpolation of the inside thereof, and a rendering thereof.

As described above, the Bresenham's algorithm with special Y major can be used to render the sides of a triangle for example. Whether or not pixels are selected in accordance with a triangle depends on the positions of the pixels inside the triangle. With reference to FIG. 14, how the pixels are selected in accordance with a triangle will be described.

FIG. 14 shows a triangle TR1 to be rendered on the X-Y coordinate plane. On a line L05 side, which is on the left of the triangle TR1, pixels inside the triangle TR1 and pixels on the line LO5 are selected. In the example shown in FIG. 14, a pixel PX04 is positioned on the line LO5, while pixels PX02, PX03, PX05, and PX06 are positioned inside t, he triangle TR1.

On a line LO6 side, which is on the right of the triangle TR1, pixels PX12 to PX16 which are all positioned inside the triangle TR1 are selected. Pixels are scanned from the direction of the pixel PX02 to the direction of the pixel PX012, namely in the X axis direction. Thus, interpolation and rendering are performed. These operations also apply to other pixels PX03 to PX13, PX04 to PX14, PX05 to PX15, and PX06 to PX16.

Therefor, when a plurality of adjacent triangles are rendered, it is possible to prevent the same pixel PXij from being dually rendered. Thus, the triangle TR1 can be accurately rendered.

(4) Selection DDA (Digital Differential Analyzer)

Before describing the algorithm of selection DDA, the difference between the selection DDA and a normal DDA will be described.

In a normal DDA, a particular incremental value is successively added. On the other hand, in the selection DDA, one of the values stored in an XT register and an XF register which will be described later is selected and then the selected value is added to the value stored in an XA register whenever data of a new pixel is obtained.

Since the coordinates of the pixels on the sides of triangles are obtained by the Bresenham's algorithm with special Y major, Z values and color data should be also obtained in accordance with this algorithm. In other words, with respect to Z values and color data, one of two constants is selected and then successively added in accordance with an increment of the X coordinate.

The selection DDA is an algorithm for obtaining Z values or color data by using a coefficient of the Bresenham's algorithm or the Bresenham's algorithm with special Y major which are used to compute X and Y coordinates. Here, the method for accomplishing the selection DDA by using a coefficient of the Bresenham's algorithm with special Y major will be described.

For example, it is assumed that a point A and a point B are placed at coordinates (X1, Y1) and (X2, Y2), respectively and that the Z value at the point A, the slope of the Z value in the X direction, and the slope of the Z value in the Y direction are Z1, Zx, and Zy, respectively. In this situation, the Z values of pixels which connect these two points are obtained. Now, dx and dy are defined as follows:

$$dx=X2-X1, dy=Y2-Y1$$

In addition, s and dB are defined as follows:

$$s=dx/dy$$

$$dB=dx\%dy$$

where "/" is an operator which is used to divide a numerator by a denominator and to round off the decimal part of the obtained result; "%" is an operator which is used to divide a numerator by a denominator and to obtain the remainder as the result.

Moreover, it is assumed that there is the following relation between dx and dy:

$$dx \geq 0, dy \geq 0$$

When the contents of the following registers are set as follows, the Z value starting from the point A can be successively obtained as the output of the ZA register:

EZA register . . . 2 |dB| (which is the discriminant E of the algorithm of selection DDA.)
EZT register . . . 2 |dB|−2 |dy|
EZF register . . . 2 |dB|
ZA register . . . Z1
ZT register . . . (s+1) Zx+Zy (incremental value)
ZF register . . . sZx+Zy (incremental value)

Figure 2:
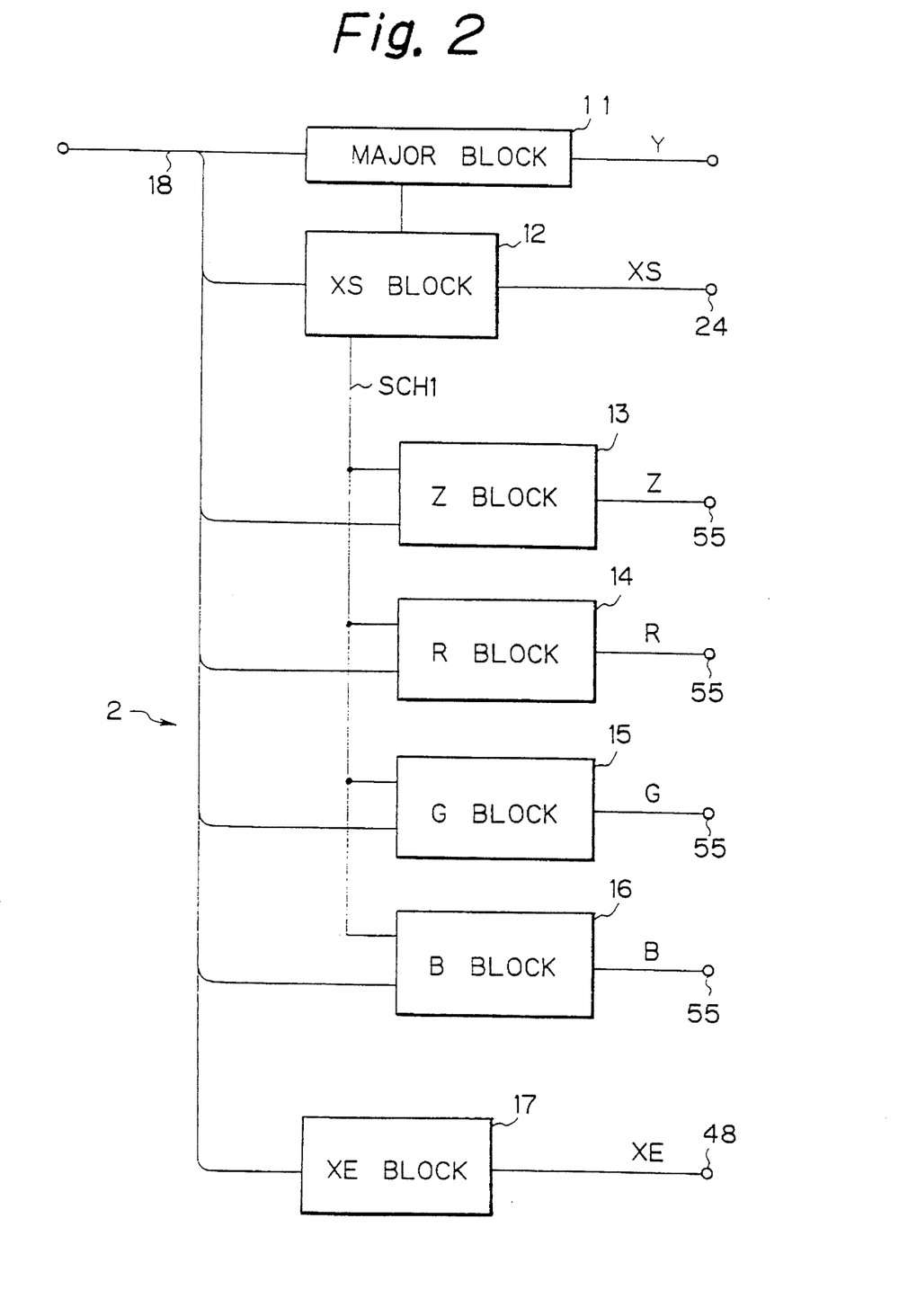
FIG. 2 is a block diagram showing a construction of a line block.

The above mentioned various algorithms are accomplished mainly by the line block 2. Next, with reference to FIG. 2, the construction of the line block 2 will be described. As shown in FIG. 2, the line block 2 mainly comprises a major block 11, an XS block 12, a Z block 13, an R block 14, a G block 15, a B block 16, and an XE block 17. These blocks 11 to 17 receive input data through a data bus 18.

When a line and an edge is rendered, the major block 11 computes each data of coordinates (X, Y) in the major axis direction. Practically, the major block 11 adds (+1) or (−1) to the data of the major axis. In addition, when a triangle is rendered, the major block 11 computes data of the Y coordinate.

The XS block 12 (FIG. 3) mainly comprises a determination unit 21 and a computation unit 22. Reference numerals 23 and 24 are terminals. Next, with reference to FIGS. 3–5, inclusive, the construction and functions of the determination unit 21 and the computation unit 22 will be described. When a line and an edge is rendered, the XS block 12 obtains coordinate data in the minor axis direction. In addition, when a triangle is rendered, the XS block 12 computes coordinate data at the initial point on the X axis. When a triangle is rendered, the XS block 12 renders a side having the maximum Y coordinate data and the minimum Y coordinate data in the area from coordinates (X1, Y1) to (X3, Y3) surrounded by three vertexes of the triangle.

Next, the determination unit 21 will be described. FIG. 4 shows a construction of the determination unit 21. In the construction shown in FIG. 4, the determination unit 21 mainly comprises an ET register 31 and an EF register 32 for storing and outputting an incremental value of an evaluation coefficient for use with each rendering algorithm such as the Bresenham's algorithm; a selector 33 for selecting one of the outputs from the registers 31 and 32; an adder 34; an EA register 35 for storing and outputting the addition result as an evaluation coefficient; a zero detector 36 for determining whether or not the addition result is zero; and a selector 37 for outputting a determination signal SCH1 for controlling the selector 33. Reference numeral 38 is a terminal for obtaining the determination signal SCH1.

All the ET register 31, the EF register 32, and the EA register 35 have 16 bits and store signed integer data. The EA register 35 stores 16-bit integer data represented in 2's complementary notation. Since this integer data is in the 2's complementary notation, the most significant bit (MSB) is used as a sign bit.

The computation unit 22 will now be described. FIG. 5 shows a construction of the computation unit 22. In the construction shown in FIG. 5, the computation unit 22 mainly comprises an XT register 41 and an XF register 42 for storing and outputting an increment of rendering data; a selector 43 supplied with the determination signal SCH1 at terminal 38 for selecting one of outputs from the registers 41 and 42; an adder 44; and an XA register 45 for storing and outputting the addition result of the adder 44. Reference numeral 24 is a terminal for obtaining output data of the computation unit 22. The XT register 41, the XF register 42, and the XA register 45 store 16-bit signed integer data.

Figure 3:
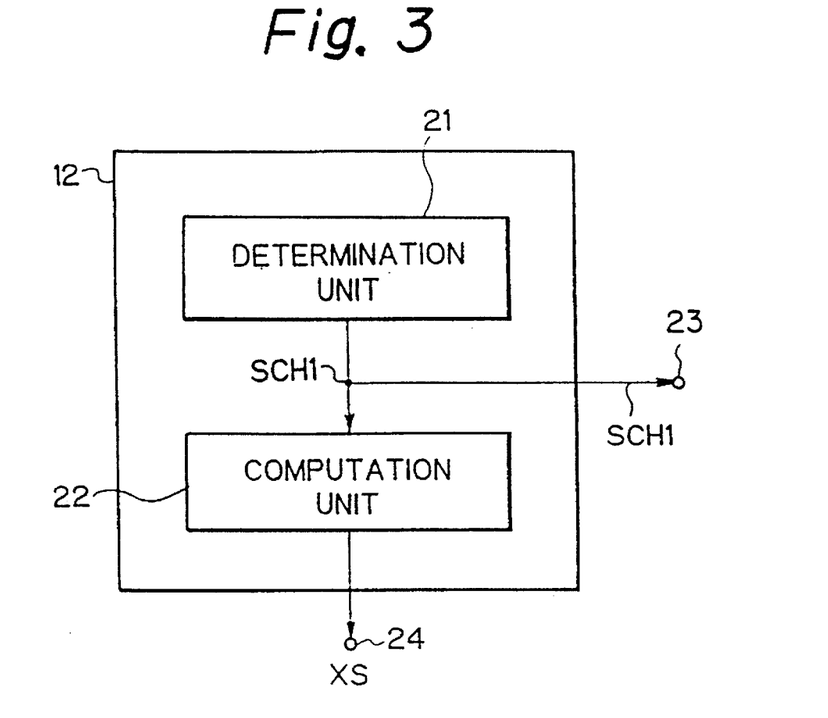
FIG. 3 is a block diagram showing a construction of an XS block.

Then, with reference to FIGS. 3 to 5, the function of the XS block 12 will be described. In the first step, initial values are input to all the registers. In this step, various initial values including an incremental value defined by each algorithm described above are set.

In the next step, one of the outputs of the ET register 31 and the EF register 32 is selected by the selector 33 controlled with the determination signal SCH1 received from the selector 37.

The adder 34 adds data fed back from the EA register 35 with data received through the selector 33. The addition result is fed back to the EA register 35 and sent to the zero detector 36.

The EA register 35 stores the new data instead of the old data. The 16-bit data which is newly stored is fed back to the adder 34. In addition, only the MSB of the 16-bit data is sent to the selector 37 as a sign bit.

The zero detector 36 determines whether or not the addition result is zero. When the zero detector 36 detects a zero addition result it sends a zero detection signal SDT to the selector 37.

The selector 37 receives only the MSB of the 16-bit data as a sign bit from the EA register 35. In addition, the selector 37 receives "0" or "1" which is a zero-process designation bit from the control block 7 through the terminal 39. When the selector 37 does not receive the zero detection signal SDT from the zero detector 36, it selects the sign bit from the EA register 35 and sends this bit as a determination signal SCH1 to the selector 33. The selector 37 also sends the determination signal SCH1 to the computation unit 22 through the terminal 38. In addition, the determination signal SCH1 is also sent to other blocks, which are the Z block 13, the R block 14, the G block 15, the B block, and so forth, through the terminal 23. When the selector receives the zero detection signal SDT from the zero detector 36, it selects the zero process designation bit.

Figure 10:
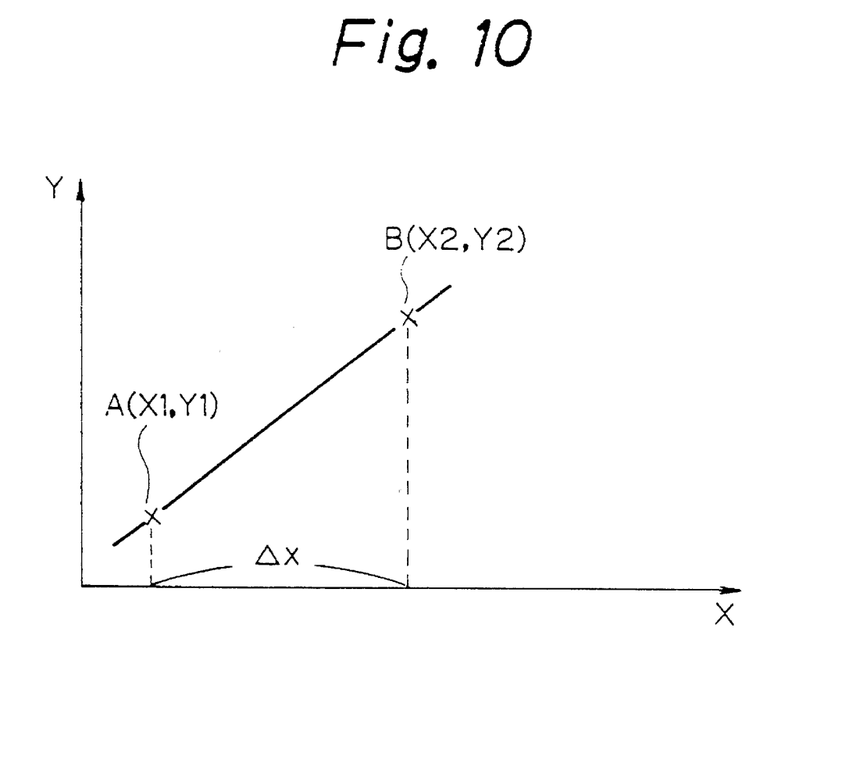
FIG. 10 is a chart describing a line rendering based on coordinates of an initial point and a terminal point.
Figure 11:
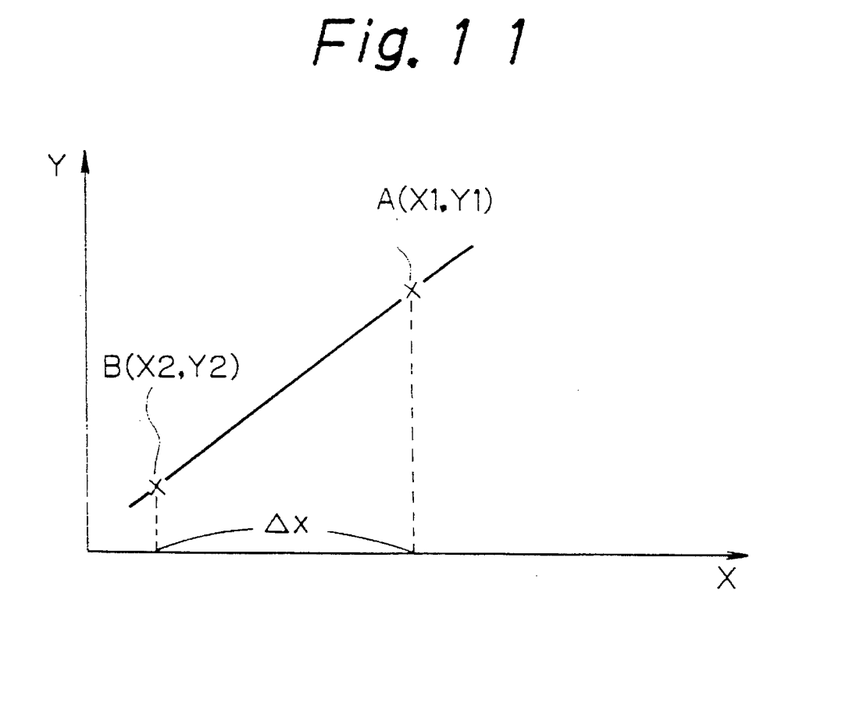
FIG. 11 is another chart describing a line rendering based on coordinates of an initial point and a terminal point.

With reference to FIGS. 10 and 11, the zero process designation bit will now be described.

In FIG. 10, it is assumed that an initial point A and a terminal point B are placed at coordinates (X1, Y1) and (X2, Y2), respectively. When a line which connects the initial point A and the terminal point B is rendered, the following relation is satisfied:

$$\Delta x = X2 - X1 > 0, \text{ thus } \Delta x > 0$$

In this case, "0" is treated as a negative value.

In FIG. 11, it is assumed that an initial point A and a terminal point B are placed at coordinates (X1, Y1) and (X2, Y2), respectively. When a line which connects the initial point A and the terminal point B is rendered, the following relation is satisfied:

$$\Delta = X2 - X1 < 0, \text{ thus } \Delta x < 0$$

In this case, "0" is treated as a positive value.

When "0" is treated as a positive value, "0" is output as the zero process designation bit. In contrast, when "0" is treated as a negative value, "1" is output as the zero process designation bit.

When the selector 37 receives the zero detection signal SDT from the zero detector, it sends the zero process designation bit as the determination signal SCH1 to the selector 33 and the computation unit 22 through the terminal 38. In addition, the determination signal SCH1 is also sent to other blocks, which are the Z block 13, the R block 14, the G block 15, the B block 16, and so forth, through the terminal 23.

Since one of the outputs from the EF register 32 and the ET register 31 is selected with the zero process designation bit, when for example a line is rendered, the initial point can be substituted for the terminal point.

For example, it is assumed that the initial point and the terminal point are placed at X coordinate X1 and X2, respectively.

In addition, it is assumed that when X2–X1>0, the EF register 32 is selected and that when X2–X1 <0, the ET register 31 is selected. In this situation, even if the initial point is substituted for the terminal point, the same line can be rendered.

The selector 43 in the computation unit 22 compares the discriminant E of each algorithm with "0". Depending on whether the value of the discriminant E is positive or negative, the connection state is controlled.

When it is determined that the value of the determination signal SCH1 is non-negative, the connection state is controlled so that the selector 43 selects the value of the XT register 41. When it is determined that the signal is negative, the connection sate is controlled so that the value of the XF register 42 is selected. The selected incremental value which is selected by the selector 43 and stored in the XT register 41 or the XF register 42 is sent to the adder 44.

The adder 44 adds data fed back from the XA register 45 with data received through the selector 43. The addition result is sent to the XA register 45.

The XA register 45 stores newly received data as the data of the new X coordinate instead of the old data. The data stored in the XA register 45 becomes the data of the X coordinate of the pixel to be obtained. The new 16-bit X coordinate data is fed back to the adder 44 and also obtained from the terminal 24.

Figure 6:
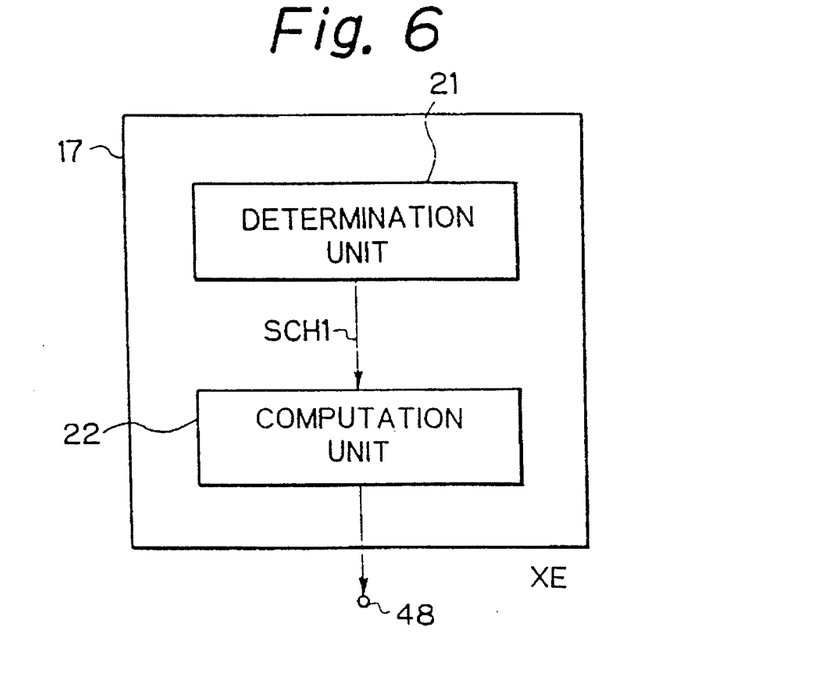
FIG. 6 is a block diagram showing a construction of an XE block.

As shown in FIG. 6, the XE block 17 mainly comprises the determination unit 21 and the computation unit 22. Since constructions and functions of the determination unit 21 and the computation unit 22 are the same as those of the XS block 12, their description will be omitted for simplicity. Reference numeral 48 is a terminal. The XE block 17 also has a function for rendering the other two sides of a triangle which are not rendered by the XS block 12.

Figure 7:
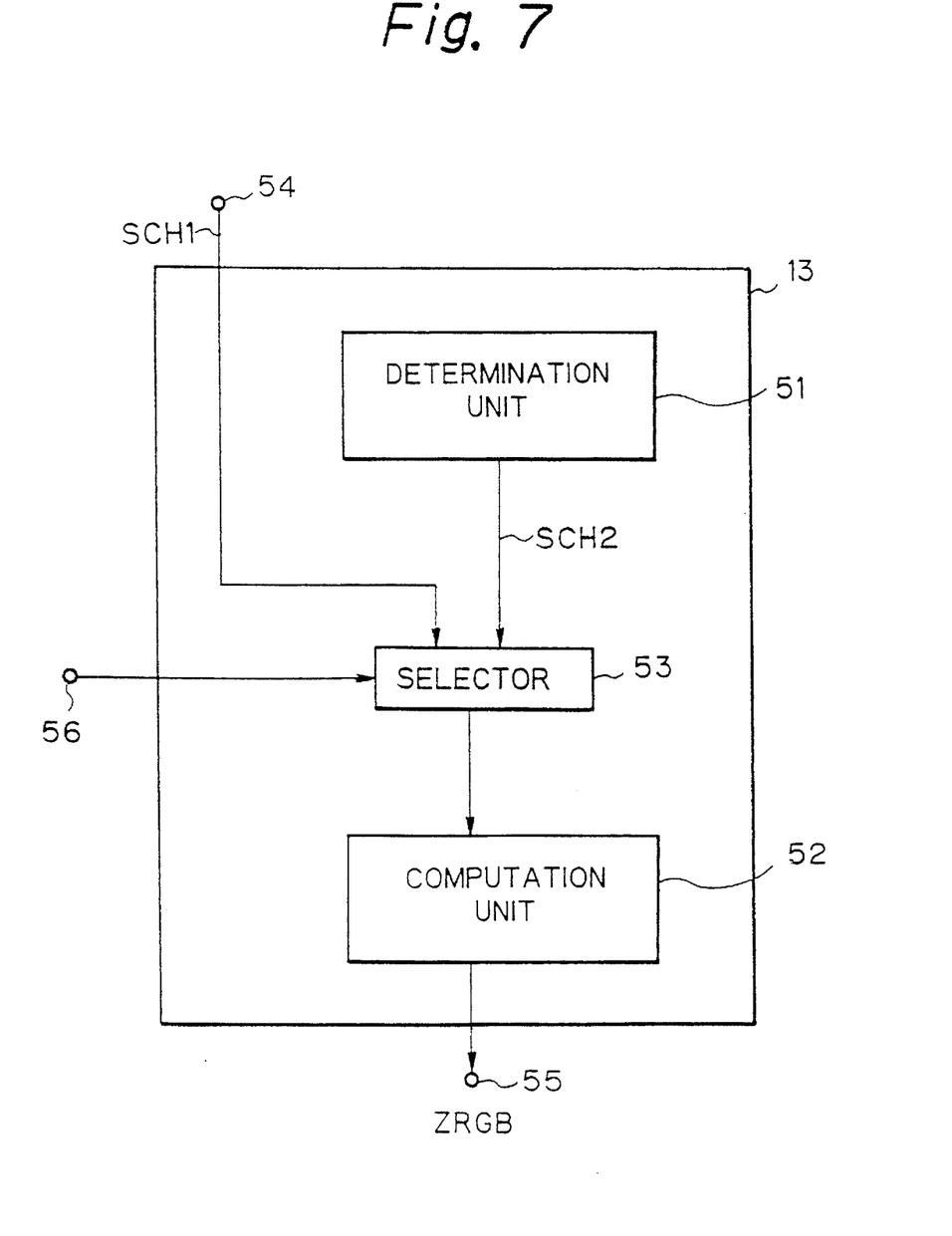
FIG. 7 is a block diagram showing a construction of a Z block.
Figure 8:
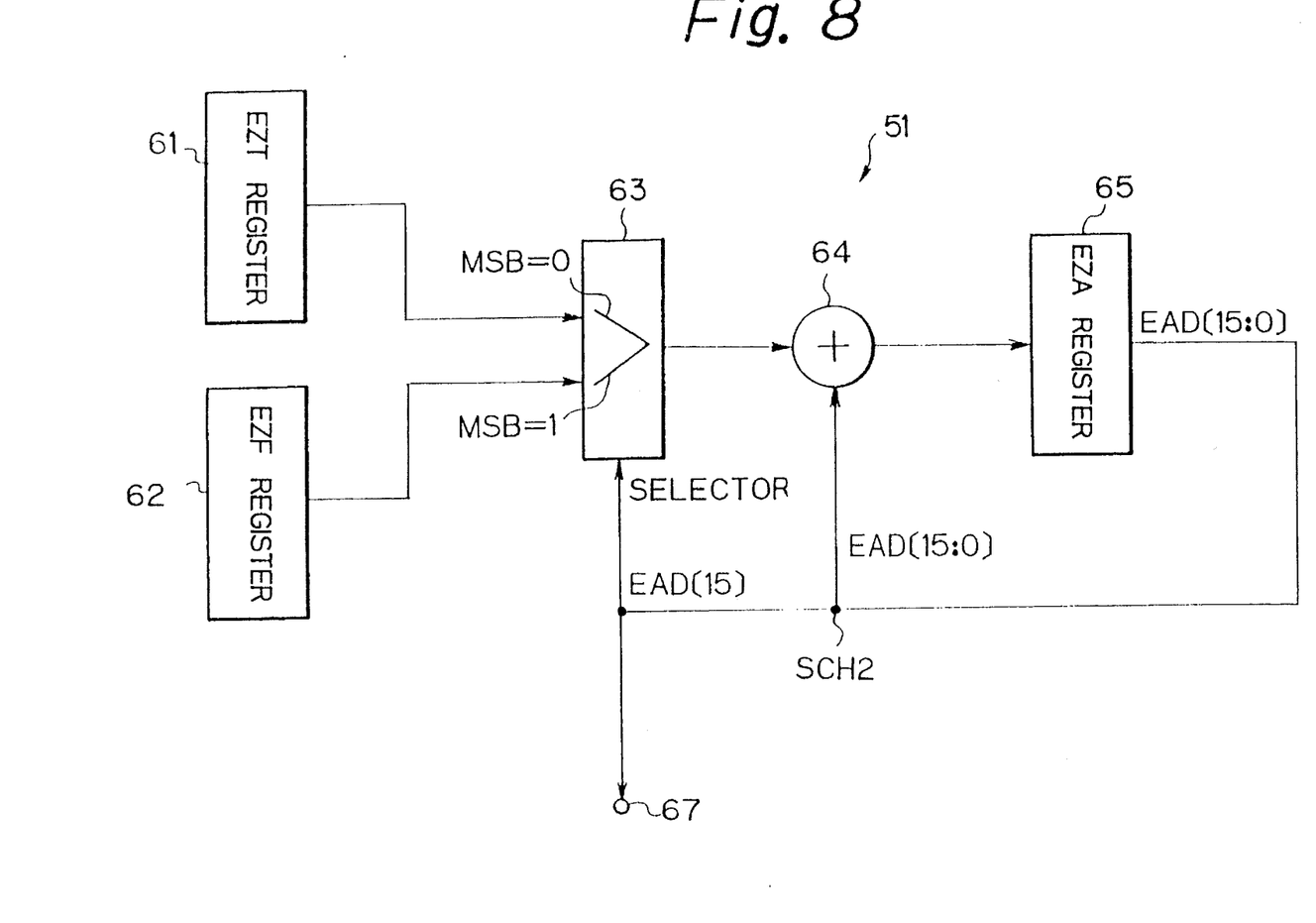
FIG. 8 is a block diagram showing a construction of a determination unit in the Z block.
Figure 9:
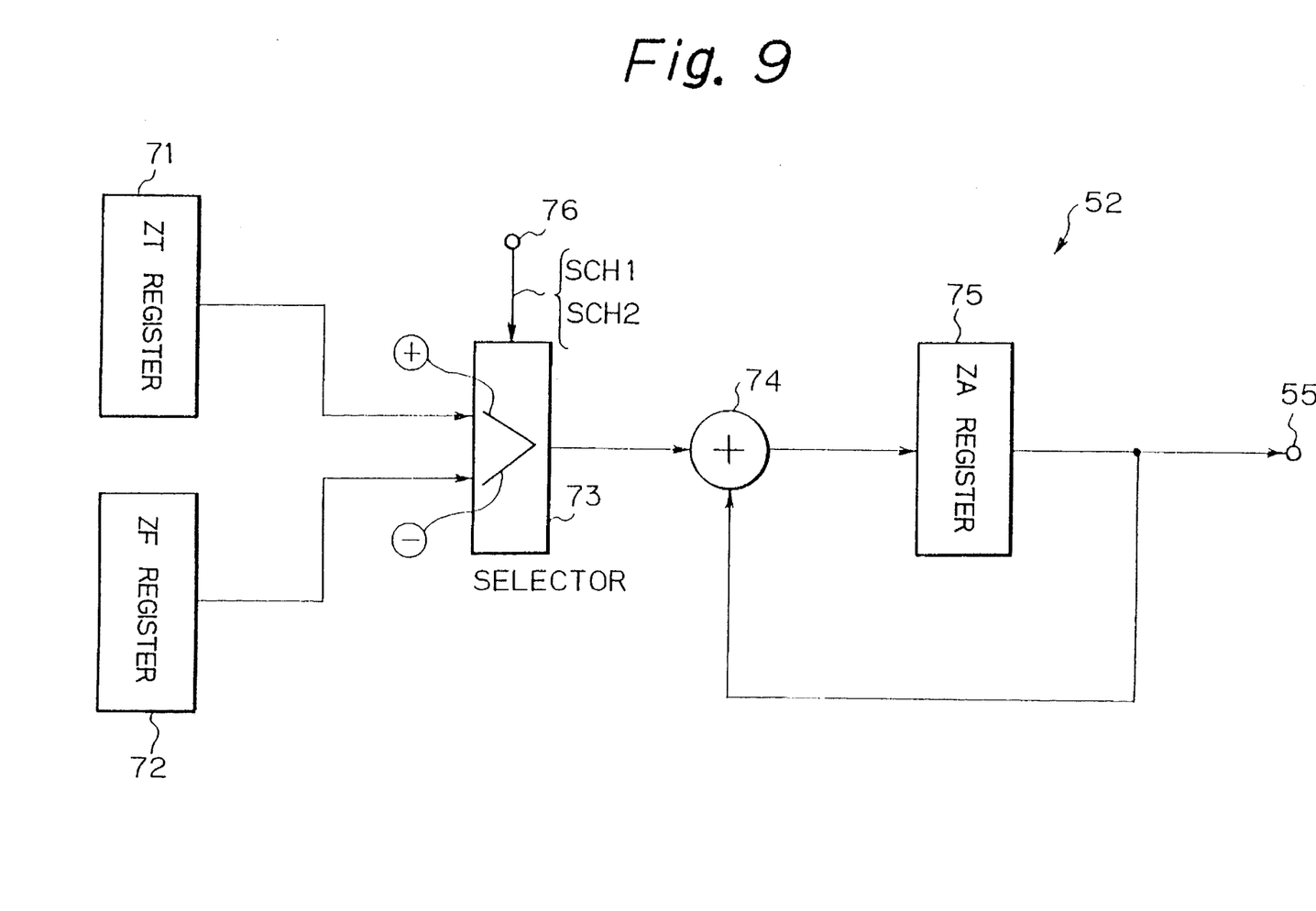
FIG. 9 is a block diagram showing a construction of a computation unit of the Z block.

Next, with reference to FIGS. 7 to 9, a construction of the Z block 13 for computing a Z value used in a Z buffer method, and those of the R block 14, the G block 15, and the B block 16 for computing color data one pixel at a time will be described. Since the constructions of the Z block 13, the R block 14, the G block 15, and the B block 16 are all the same, except for the number of bits they have, only the construction of the Z block 13 will be described as an example and those of the other blocks will be omitted for simplicity.

The Z block 13 mainly comprises a determination unit 51, a computation unit 52, and a selector 53. Reference numerals 54, 55 and 56 are terminals. Next, the constructions and functions of the determination unit 51, the computation unit 52, and the selector 53 will be described.

First, the construction and the function of the determination unit 51 will be described. FIG. 8 shows the construction of the determination unit 51. In the construction shown in FIG. 8, the determination unit 51 mainly comprises an EZT register 61 and an EZF register 62 for storing and outputting an increment of an evaluation coefficient for use with each rendering algorithm such as the Bresenham's algorithm; a selector 63 for selecting one of outputs from the registers 61 and 62; an adder 64; and an EZA register 65 for storing and outputting the addition result as the evaluation coefficient. Reference numeral 67 is a terminal for obtaining a determination signal SCH2.

All the EZT register 61, the EZF register 62, and the EZA register 65 store 16-bit signed integer data. The EZA register 65 stores 16-bit integer data represented in 2's complementary notation. Since this integer data is in 2's complementary notation, MSB is used as a sign bit.

Next, a function of the selector 53 will be described. The selector 53 selects one of the determination signals SCH1 and SCH2 with a selection signal received from the control block 7 through the terminal 56. The selected signal of the determination signal SCH1 or SCH2 is sent to the computation unit 52. In other words, by the selector 53, one of the determination signal SCH2 from the determination unit 51 and the determination signal SCH1 from the XS block 12 can be selected as the control signal for a selector 73 in the computation unit 52.

Next, a construction of the computation unit 52 will be described. FIG. 9 shows the construction of the computation unit 52. In the construction shown in FIG. 9, the computation unit 52 mainly comprises a ZT register 71 and a ZF register 72 for storing and outputting an increment of rendering data; a selector 73 for selecting one of outputs of the registers 71 and 72; an adder 74; and a ZA register 75 for storing and outputting the addition result.

Reference numeral 76 is a terminal for receiving the determination signal SCH1 or SCH2. The ZT register 71, the ZF register 72, and the ZA register 75 in the Z block 13 use 32-bit signed fixed decimal data. On the other hand, these registers 71, 72, and 75 in the R block 14, the G block 15, and the B block 16 use 16-bit signed fixed decimal data.

Next, a function of the Z block 13 will be described. In the first step, initial values are input to all the registers. In this step, various initial values including an incremental value defined by each algorithm are set. In the next step, the outputs of the EZT register 61 and the EZF register 62 are sent to the selector 63.

The selector 63 is controlled with the determination signal SCH2 received from the EZA register 65. As the determination signal SCH2, the MSB of the data stored in the EZA register 65 is used.

When the sign bit is positive, namely the MSB is "0", the selector 63 selects the output of the EZT register 61. On the other hand, when the sign bit is negative, namely MSB is "1", the selector 63 selects the output of the EZF register 62. The selected data is sent to the adder 64.

The adder 64 adds data fed back from the EZA register 65 with data received through the selector 63. The addition result is sent to the EZA register 65.

The EZA register 65 stores the new data instead of the old data. The new 16-bit data is fed back to the adder 64. The MSB of the 16-bit data is sent to the selector 63 as the determination signal SCH2. The determination signal SCH2 is also sent to the selector 53 through the terminal 67.

The connection state of the selector 53 is controlled with the selection signal received from the control block 7 through the terminal 56. Thus, the selector 53 selects one of the determination signal SCH1 or SCH2. For example, when the algorithm of the selection DDA is applied, each determination unit 51 in the Z block 13, the R block 14, the G block 15, and the B block 16 receives the same value as the determination unit 21 in the XS block 12 and performs the same function. Thus, to reduce the overhead of the initial values to be set, the determination signal SCH1 which is received from the determination unit 21 in the XS block 12 is used instead of each determination unit 51 in the Z block 13, the R block 14, the G block 15, and the B block 16.

When any algorithm other than the algorithm of the selection DDA is applied, the selection signal SCH2 is selected.

The computation unit 52 sends the determination signal SCH1 or SCH2 to the selector 73 through the terminal 76. When it is determined that the determination signal SCH1 or SCH2 is non-negative, the connection state is controlled so that the selector 73 selects the value of the ZT register 71. On the other hand, when it is determined that the determination signal SCH1 or SCH2 is negative, the connection state is controlled so that the selector 73 selects the value of the ZF register 72. The output as an incremental value stored in the ZT register 71 or the ZF register 72 is sent to the adder 74.

The adder 74 adds data fed back from the ZA register 75 with data received through the selector 73. The addition result is sent to the ZA register 75.

The ZA register 75 stores the new data instead of the old data. The data of the Z value stored in the ZA register 75 becomes the data of the Z value of the pixel to be obtained. The new 32-bit Z value data being stored is fed back to the adder 74 and also obtained from the terminal 55.

According to the above mentioned embodiment, when a line is rendered, the determination signal SCH1 corresponding to the sign of the discriminant E in accordance with the Bresenham's algorithm is formed by the determination unit 21 in the XS block 12. With the determination signal SCH1, an incremental value stored in the XT register 41 or the XF register 42 of each computation unit 22 in the XS block 12 is selectively obtained. Thus, an incremental value of data of the X coordinate and/or the Y coordinate can be correctly selected and a line can be accurately rendered.

In addition, according to the above mentioned embodiment, when a line is rendered, the determination signal SCH2 corresponding to the sign of the discriminant E in accordance with the Bresenham's algorithm with slope of more than 1 is formed by each determination unit 51 in the Z block 13, the R block 14, the G block 15, and the B block 16. With the determination signal SCH2, an incremental value stored in the ZT register 71 or the ZF register 72 of each computation unit 52 in the Z block 13, the R block 14, the G block 15, and the B block 16 is selectively obtained. Thus, an incremental value can be correctly selected and Z values and color data can be correctly computed. Therefore, a hidden line- and hidden surface-eliminating process can be correctly performed.

According to the above mentioned embodiment, when the sides of a triangle are rendered, the determination signal SCH1 corresponding to the sign of the discriminant E in accordance with the Bresenham's algorithm with special Y major is formed by the determination unit 21 in the XS block 12. With the determination signal SCH1, an incremental value stored in the XT register 41 or the XF register 42 of the computation unit 22 in the XS block 12 is selectively obtained. Thus, an incremental value of data of an X coordinate and/or a Y coordinate can be correctly selected.

As described above, on a line LO5 side which is on the left of a triangle TR1, pixels inside or on the line LO5 are selected. In addition, on a line LO6 side which is on the right of the triangle TR1, pixels PX12 to PX16 inside the triangle TR1 are selected. Thus, when a plurality of adjacent triangles are rendered, it is possible to prevent the same pixel PXij from being dually rendered. Therefore, the sides of the triangle TR1 can be accurately rendered.

According to the above mentioned embodiment, when the sides of a triangle are rendered, the determination signal SCH1 corresponding to the sign of the discriminant E in accordance with the algorithm of selection DDA is formed by the determination unit 21 in the XS block 12. With the determination signal SCH1, an incremental value stored in the ZT register 71 or the ZF register 72 of each computation unit 52 in the Z block 13, the R block 14, the G block 15, and the B block 16 is selectively obtained. Thus, an incremental value can be correctly selected and Z values and color data can be correctly computed. Therefore, a hidden line- and hidden surface-eliminating process can be correctly performed.

According to the above mentioned embodiment, when an edge is rendered, the determination signal SCH1 corresponding to the sign of the discriminant E in accordance with the Bresenham's algorithm is formed by the determination unit 21 in the XS block 12. With the determination signal SCH1, the incremental value stored in the XT register 41 or the XF register 42 of the computation unit 22 in the XS block 12 is selectively obtained. Thus, an incremental value of data of a X coordinate and/or a Y coordinate can be correctly selected.

Moreover, according to the above mentioned embodiment, when an edge is rendered, the determination signal SCH2 corresponding to the sign of the discriminant E in accordance with the Bresenham's algorithm with slope of more than 1 is formed by each determination unit 51 in the R block 14, the G block 15, and the B block 16. With the determination signal SCH2, an incremental value stored in the ZT register 71 or the ZF register 72 of each computation unit 52 in the R block 14, the G block 15, and the B block 16 is selectively obtained. Thus, a incremental value can be correctly selected and color data can be correctly computed.

Further, according to the above mentioned embodiment, when an edge is rendered, the determination signal SCH2 corresponding to the sign of the discriminant E in accordance with the algorithm of selection DDT is formed by the determination unit 51 in the Z block 13. With the determination signal SCH2, an incremental value stored in the ZT register 71 or the ZF register 72 of the computation unit 52 in the Z block 13 is selectively obtained. Thus, an incremental value can be correctly selected and Z values can be correctly computed. Therefore, a hidden line- and hidden surface-eliminating process can be correctly performed.

According to the invention with respect to claim 1, an incremental value corresponding to initial values of coordinate data of axes X, Y, and Z composed of three dimensions can be properly selected in accordance with a variation of the coordinate data. Thus, a line can be correctly rendered and Z values and color data can be correctly computed. Therefore, a hidden line- and hidden surface-eliminating process can be correctly performed. Thus, when edges of a surface are rendered, they can be correctly placed on a three-dimensional plane.

When a triangle is rendered, it is possible to prevent pixels in the vicinity of the boundary line of an adjacent triangle from being dually rendered. Thus, it is possible to prevent the adjacent triangle from rendering the same pixel. In addition, at the boundary of the adjacent triangle, pixels can be securely generated.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A three-dimensional primitive rendering system, comprising:

a first register and a second register for storing first and second incremental values of primitive data, respectively;

a first selector for selecting either an output of the first register or an output of the second register;

a first adder having a first input which is supplied with an output selected by the first selector and a third register having an input connected to an output of the first adder and an output which is supplied to a second input of the first adder, the first adder and the third register together successively accumulating one of the outputs of the first register or the second register;

a fourth register and a fifth register for storing first and second incremental values of an evaluation coefficient, respectively;

second selector for selecting either an output of the fourth register or an output of the fifth register;

a second adder having a first input which is supplied with an output selected by the second selector and a sixth register having an input connected to an output of the second adder and an output which is supplied to a second input of the second adder, the second adder and the sixth register together successively accumulating one of the outputs of the fourth register or the fifth register;

a zero detector connected to receive the output of the second adder; and a third selector controlled by the zero detector, and supplied with the sign bit from the sixth register and a zero process designation bit from an external source, the third selector outputting one of the sign bit or the zero process designation bit to the first and second selectors to thereby control the selections of the first and second selectors.

2. The three-dimensional primitive rendering system as set forth in claim 1, further comprising:

means for loading the following values into the first, second, fourth and fifth registers when a line or an edge is being rendered from a point A at coordinates (X1,Y1) to a point B at coordinates (X2,Y2):

first register: 1 (incremental value)

second register: 0 (incremental value)

fourth register: 2 |dy|−2 |dx| fifth register: 2 |dy| where:

dx=X2−X1;

dy=Y2−Y1; and

|dx|≧|dy|≧0.

3. The three-dimensional primitive rendering system as set forth in claim 1, further comprising:

means for loading the following values into the first, second, fourth and fifth registers when a side of a triangle is being rendered from a point A at coordinates (X1,Y1) to a point B at coordinates (X2,Y2):

first register: s+1 (incremental value)

second register: s (incremental value)

fourth register: 2 |dB|−2 |dy| fifth register: 2 |dB| where:

dx=X2−X1;

dy=Y2−Y1;

s=the integer portion of dx divided by dy;

dB=the remainder portion of dx divided by dy;

|dx|≧0; and

|dy|≧0.

* * * * *